(12) United States Patent
Boghani et al.

(10) Patent No.: US 7,955,630 B2
(45) Date of Patent: Jun. 7, 2011

(54) THERMALLY STABLE, HIGH TENSILE STRENGTH ENCAPSULATED ACTIVES

(75) Inventors: Navroz Boghani, Flanders, NJ (US); Petros Gebreselassie, Piscataway, NJ (US)

(73) Assignee: Kraft Foods Global Brands LLC, Northfield, IL (US)

( * ) Notice: Subject to any disclaimer, the term of this patent is extended or adjusted under 35 U.S.C. 154(b) by 1206 days.

(21) Appl. No.: 11/205,874

(22) Filed: Aug. 17, 2005

(65) Prior Publication Data

US 2006/0068057 A1 Mar. 30, 2006

Related U.S. Application Data

(63) Continuation-in-part of application No. 10/955,149, filed on Sep. 30, 2004, and a continuation-in-part of application No. 10/955,225, filed on Sep. 30, 2004.

(51) Int. Cl.
*A23G 4/18* (2006.01)
*B65D 85/02* (2006.01)

(52) U.S. Cl. ............... 426/5; 426/3; 426/6; 426/548

(58) Field of Classification Search ............... 426/5, 3
See application file for complete search history.

(56) References Cited

U.S. PATENT DOCUMENTS

| | | |
|---|---|---|
| 1,633,336 A | 6/1927 | Larson |
| 1,936,456 A | 11/1933 | Larson et al. |
| 2,191,199 A | 2/1940 | Hall |
| 2,197,719 A | 4/1940 | Conner |
| 2,876,167 A | 3/1959 | Manahan |
| 2,886,440 A | 5/1959 | Kramer et al. |
| 2,886,441 A | 5/1959 | Kramer et al. |
| 2,886,442 A | 5/1959 | Kramer et al. |
| 2,886,443 A | 5/1959 | Rosenthal et al. |
| 2,886,444 A | 5/1959 | Rosenthal et al. |
| 2,886,445 A | 5/1959 | Rosenthal et al. |
| 2,886,446 A | 5/1959 | Kramer et al. |
| 2,886,449 A | 5/1959 | Rosenthal et al. |
| 3,004,897 A | 10/1961 | Shore |
| 3,052,552 A | 9/1962 | Koerner et al. |
| 3,117,027 A | 1/1964 | Lindlof et al. |
| 3,124,459 A | 3/1964 | Erwin |
| 3,159,585 A | 12/1964 | Evans et al. |
| 3,241,520 A | 3/1966 | Wurster et al. |
| 3,475,533 A | 10/1969 | Mayrand |
| 3,538,230 A | 11/1970 | Pader et al. |
| 3,664,962 A | 5/1972 | Kelly et al. |
| 3,664,963 A | 5/1972 | Pasin |
| 3,677,771 A | 7/1972 | Kolar, Jr. |
| 3,795,744 A | 3/1974 | Ogawa et al. |
| 3,819,838 A | 6/1974 | Smith et al. |
| 3,821,417 A | 6/1974 | Westall et al. |
| 3,826,847 A | 7/1974 | Ogawa et al. |
| 3,857,964 A | 12/1974 | Yolles |
| 3,862,307 A | 1/1975 | Di Giulio |
| 3,872,021 A | 3/1975 | McKnight |
| 3,878,938 A | 4/1975 | Venables et al. |
| 3,897,566 A | 7/1975 | Bahoshy et al. |
| 3,912,817 A | 10/1975 | Sapsowitz |
| 3,930,026 A | 12/1975 | Clark |
| 3,943,258 A | 3/1976 | Bahoshy et al. |
| 3,962,416 A | 6/1976 | Katzen |
| 3,962,463 A | 6/1976 | Witzel |
| 3,974,293 A | 8/1976 | Witzel |
| 3,984,574 A | 10/1976 | Comollo |
| 4,032,661 A | 6/1977 | Rowsell et al. |
| 4,033,994 A | 7/1977 | Watson et al. |
| 4,037,000 A | 7/1977 | Burge et al. |
| 4,045,581 A | 8/1977 | Mackay et al. |
| 4,059,118 A | 11/1977 | Watson et al. |
| 4,060,091 A | 11/1977 | Watson et al. |
| 4,070,449 A | 1/1978 | Rowsell et al. |
| 4,083,995 A | 4/1978 | Mitchell et al. |
| 4,107,360 A | 8/1978 | Schmidgall |
| 4,130,638 A | 12/1978 | Dhabhar et al. |
| 4,136,163 A | 1/1979 | Watson et al. |
| 4,139,639 A | 2/1979 | Bahoshy et al. |
| 4,148,872 A | 4/1979 | Wagenknecht et al. |
| 4,150,112 A | 4/1979 | Wagenknecht et al. |
| 4,156,715 A | 5/1979 | Wagenknecht et al. |
| 4,156,716 A | 5/1979 | Wagenknecht et al. |
| 4,157,385 A | 6/1979 | Wagenknecht et al. |
| 4,159,315 A | 6/1979 | Wagenknecht et al. |
| 4,160,054 A | 7/1979 | Wagenknecht et al. |

(Continued)

FOREIGN PATENT DOCUMENTS

CA 1 208 966 8/1986

(Continued)

OTHER PUBLICATIONS

Prencipe et al.; Squeezing out a better toothpaste; Chemtech, Dec. 1995;http://pubs.acs.org/hotartcl/chemtech/95/dec/dec.html; printed Apr. 20, 2004; pp. 1-7.

(Continued)

*Primary Examiner* — Keith D Hendricks
*Assistant Examiner* — Elizabeth Gwartney
(74) *Attorney, Agent, or Firm* — Cantor Colburn LLP

(57) ABSTRACT

In some embodiments there is a composition including a thermally stabilized active composition and a high molecular weight polymer. The thermally stabilized active composition is resistance to degradation at higher temperatures such as those used for conducting extrusion with high molecular weight polyvinyl aceate.

30 Claims, No Drawings

U.S. PATENT DOCUMENTS

| | | |
|---|---|---|
| 4,160,820 A | 7/1979 | Wagenknecht et al. |
| 4,187,320 A | 2/1980 | Koch et al. |
| 4,193,936 A | 3/1980 | Watson et al. |
| 4,208,431 A | 6/1980 | Friello et al. |
| 4,217,368 A | 8/1980 | Witzel et al. |
| 4,224,345 A | 9/1980 | Tezuka et al. |
| 4,230,688 A | 10/1980 | Rowsell et al. |
| 4,271,197 A | 6/1981 | Hopkins et al. |
| 4,271,199 A | 6/1981 | Cherukuri et al. |
| 4,276,312 A | 6/1981 | Merritt |
| 4,295,845 A | 10/1981 | Sepulveda et al. |
| 4,314,990 A | 2/1982 | Denny, Jr. et al. |
| 4,340,583 A | 7/1982 | Wason |
| 4,352,822 A | 10/1982 | Cherukuri et al. |
| 4,352,823 A | 10/1982 | Cherukuri et al. |
| 4,352,825 A | 10/1982 | Cherukuri et al. |
| 4,363,756 A | 12/1982 | Sepulveda et al. |
| 4,384,004 A | 5/1983 | Cea et al. |
| 4,386,106 A | 5/1983 | Merritt et al. |
| 4,388,328 A | 6/1983 | Glass |
| 4,452,821 A | 6/1984 | Gergely |
| 4,457,857 A | 7/1984 | Sepulveda et al. |
| 4,459,425 A | 7/1984 | Amano et al. |
| 4,485,118 A | 11/1984 | Carroll et al. |
| 4,497,832 A | 2/1985 | Cherukuri et al. |
| 4,513,012 A | 4/1985 | Carroll et al. |
| 4,515,769 A | 5/1985 | Merritt et al. |
| 4,568,560 A | 2/1986 | Schobel |
| 4,585,649 A | 4/1986 | Lynch |
| 4,590,075 A | 5/1986 | Wei et al. |
| 4,597,970 A | 7/1986 | Sharma et al. |
| 4,614,649 A | 9/1986 | Gorman et al. |
| 4,614,654 A | 9/1986 | Ream et al. |
| 4,627,987 A | 12/1986 | Barnett et al. |
| 4,634,593 A | 1/1987 | Stroz et al. |
| 4,673,577 A | 6/1987 | Patel |
| 4,711,784 A | 12/1987 | Yang |
| 4,722,845 A | 2/1988 | Cherukuri et al. |
| 4,726,953 A | 2/1988 | Carroll et al. |
| 4,740,376 A | 4/1988 | Yang |
| 4,741,905 A | 5/1988 | Huzinec |
| 4,749,575 A | 6/1988 | Rotman |
| 4,751,095 A | 6/1988 | Karl et al. |
| 4,752,481 A | 6/1988 | Dokuzovic |
| 4,753,790 A | 6/1988 | Silva et al. |
| 4,771,784 A | 9/1988 | Kozin et al. |
| 4,800,087 A | 1/1989 | Mehta |
| 4,803,082 A | 2/1989 | Cherukuri et al. |
| 4,804,548 A | 2/1989 | Sharma et al. |
| 4,816,265 A | 3/1989 | Cherukuri et al. |
| 4,822,599 A | 4/1989 | Mitra |
| 4,824,681 A | 4/1989 | Schobel et al. |
| 4,828,845 A | 5/1989 | Zamudio-Tena et al. |
| 4,828,857 A | 5/1989 | Sharma et al. |
| 4,842,762 A | 6/1989 | Sabol, Jr. et al. |
| 4,871,570 A | 10/1989 | Barnett et al. |
| 4,904,482 A | 2/1990 | Patel et al. |
| 4,911,934 A | 3/1990 | Yang et al. |
| 4,915,958 A | 4/1990 | Faust et al. |
| 4,918,182 A | 4/1990 | Jackson et al. |
| 4,919,841 A | 4/1990 | Kamel et al. |
| 4,923,684 A | 5/1990 | Ibrahim et al. |
| 4,927,646 A | 5/1990 | Jenner |
| 4,929,447 A | 5/1990 | Yang |
| 4,931,293 A | 6/1990 | Cherukuri et al. |
| 4,933,190 A | 6/1990 | Cherukuri et al. |
| 4,952,407 A | 8/1990 | Record et al. |
| 4,971,797 A | 11/1990 | Cherukuri et al. |
| 4,971,806 A | 11/1990 | Cherukuri et al. |
| 4,978,537 A | 12/1990 | Song |
| 4,981,698 A | 1/1991 | Cherukuri et al. |
| 4,985,236 A | 1/1991 | Ibrahim et al. |
| 4,986,991 A | 1/1991 | Yatka et al. |
| 4,997,659 A | 3/1991 | Yatka et al. |
| 5,004,595 A | 4/1991 | Cherukuri et al. |
| 5,009,893 A | 4/1991 | Cherukuri et al. |
| 5,009,900 A | 4/1991 | Levine et al. |
| 5,017,385 A | 5/1991 | Wienecke |
| 5,041,294 A | 8/1991 | Patel |
| 5,043,154 A | 8/1991 | Gaffar et al. |
| 5,043,169 A | 8/1991 | Cherukuri et al. |
| 5,057,327 A | 10/1991 | Yatka et al. |
| 5,057,328 A | 10/1991 | Cherukuri et al. |
| 5,059,429 A | 10/1991 | Cherukuri et al. |
| 5,064,658 A | 11/1991 | Cherukuri et al. |
| 5,073,389 A | 12/1991 | Wienecke |
| 5,080,887 A | 1/1992 | Gaffar et al. |
| 5,082,671 A | 1/1992 | Cherukuri |
| 5,084,278 A | 1/1992 | Mehta |
| 5,096,699 A | 3/1992 | Gaffar et al. |
| 5,096,701 A | 3/1992 | White, Jr. et al. |
| 5,100,678 A | 3/1992 | Reed et al. |
| 5,108,763 A | 4/1992 | Chau et al. |
| 5,126,151 A | 6/1992 | Bodor et al. |
| 5,139,793 A | 8/1992 | Johnson et al. |
| 5,139,794 A | 8/1992 | Patel et al. |
| 5,139,798 A | 8/1992 | Yatka et al. |
| 5,154,939 A * | 10/1992 | Broderick et al. ................ 426/5 |
| 5,158,790 A | 10/1992 | Witkewitz et al. |
| 5,164,210 A | 11/1992 | Campbell et al. |
| 5,169,657 A | 12/1992 | Yatka et al. |
| 5,169,658 A | 12/1992 | Yatka et al. |
| 5,174,514 A | 12/1992 | Prodi |
| 5,176,900 A | 1/1993 | White, Jr. et al. |
| 5,198,251 A | 3/1993 | Song et al. |
| 5,202,112 A | 4/1993 | Prencipe et al. |
| 5,208,009 A | 5/1993 | Gaffar et al. |
| 5,226,335 A | 7/1993 | Sitte et al. |
| 5,227,182 A | 7/1993 | Song et al. |
| 5,229,148 A * | 7/1993 | Copper ............................ 426/5 |
| 5,240,710 A | 8/1993 | Bar-Shalom et al. |
| 5,244,670 A | 9/1993 | Upson et al. |
| 5,256,402 A | 10/1993 | Prencipe et al. |
| 5,266,335 A | 11/1993 | Cherukuri et al. |
| 5,266,592 A | 11/1993 | Grub et al. |
| 5,273,741 A | 12/1993 | Gaftar et al. |
| 5,284,659 A | 2/1994 | Cherukuri et al. |
| 5,300,283 A | 4/1994 | Prencipe et al. |
| 5,334,375 A | 8/1994 | Nabi et al. |
| 5,334,396 A | 8/1994 | Yatka |
| 5,336,509 A | 8/1994 | McGrew et al. |
| 5,352,439 A | 10/1994 | Norfleet et al. |
| 5,364,627 A | 11/1994 | Song |
| 5,372,824 A | 12/1994 | Record et al. |
| 5,380,530 A | 1/1995 | Hill |
| 5,385,729 A | 1/1995 | Prencipe et al. |
| 5,391,315 A | 2/1995 | Ashkin |
| 5,405,604 A | 4/1995 | Hall |
| 5,407,665 A | 4/1995 | McLaughlin et al. |
| 5,413,799 A | 5/1995 | Song et al. |
| 5,415,880 A | 5/1995 | Song et al. |
| 5,429,827 A | 7/1995 | Song et al. |
| 5,431,930 A | 7/1995 | Patel et al. |
| 5,437,876 A | 8/1995 | Synosky et al. |
| 5,437,878 A | 8/1995 | Panhorst et al. |
| 5,458,879 A | 10/1995 | Singh et al. |
| 5,462,754 A | 10/1995 | Synosky et al. |
| 5,474,787 A | 12/1995 | Grey et al. |
| 5,480,668 A | 1/1996 | Nofre et al. |
| 5,487,902 A | 1/1996 | Andersen et al. |
| 5,498,378 A | 3/1996 | Tsaur et al. |
| 5,501,864 A | 3/1996 | Song et al. |
| 5,503,823 A | 4/1996 | Norfleet et al. |
| 5,505,933 A | 4/1996 | Norfleet et al. |
| 5,523,098 A | 6/1996 | Synosky et al. |
| 5,532,004 A | 7/1996 | Bell et al. |
| 5,545,424 A | 8/1996 | Nakatsu et al. |
| 5,582,816 A | 12/1996 | Mandanas et al. |
| 5,589,160 A | 12/1996 | Rice |
| 5,589,194 A | 12/1996 | Tsuei et al. |
| 5,599,527 A | 2/1997 | Hsu et al. |
| 5,603,920 A | 2/1997 | Rice |
| 5,603,971 A | 2/1997 | Porzio et al. |
| 5,618,517 A | 4/1997 | Miskewitz |
| 5,626,892 A | 5/1997 | Kehoe et al. |
| 5,629,035 A | 5/1997 | Miskewitz |
| 5,633,027 A | 5/1997 | Cherukuri et al. |

| | | |
|---|---|---|
| 5,637,618 A | 6/1997 | Kurtz et al. |
| 5,645,821 A | 7/1997 | Libin |
| 5,651,958 A | 7/1997 | Rice |
| 5,658,553 A | 8/1997 | Rice |
| 5,676,932 A | 10/1997 | Wason et al. |
| 5,693,334 A | 12/1997 | Miskewitz |
| 5,698,215 A | 12/1997 | Kalili et al. |
| 5,702,687 A | 12/1997 | Miskewitz |
| 5,713,738 A | 2/1998 | Yarborough |
| 5,716,601 A | 2/1998 | Rice |
| 5,725,865 A | 3/1998 | Mane et al. |
| 5,736,175 A | 4/1998 | Cea et al. |
| 5,744,180 A | 4/1998 | Cherukuri et al. |
| 5,756,074 A | 5/1998 | Ascione et al. |
| 5,783,725 A | 7/1998 | Kuhn et al. |
| 5,789,002 A | 8/1998 | Duggan et al. |
| 5,800,848 A | 9/1998 | Yatka et al. |
| 5,824,291 A | 10/1998 | Howard |
| 5,869,028 A | 2/1999 | McGill et al. |
| 5,879,728 A | 3/1999 | Graff et al. |
| 5,912,007 A | 6/1999 | Pan et al. |
| 5,939,051 A | 8/1999 | Santalucia et al. |
| 6,027,746 A | 2/2000 | Lech |
| 6,056,992 A | 5/2000 | Lew |
| 6,159,509 A | 12/2000 | Johnson et al. |
| 6,174,514 B1 | 1/2001 | Cherukuri et al. |
| 6,190,644 B1 | 2/2001 | McClanahan et al. |
| 6,238,690 B1 | 5/2001 | Kiefer et al. |
| 6,239,690 B1 | 5/2001 | Burbidge et al. |
| 6,261,540 B1 | 7/2001 | Nelson |
| 6,290,933 B1 | 9/2001 | Durga et al. |
| 6,306,429 B1 | 10/2001 | Bealin-Kelly |
| 6,365,209 B2 | 4/2002 | Cherukuri |
| 6,379,652 B1 | 4/2002 | Liu et al. |
| 6,379,654 B1 | 4/2002 | Gebreselassie et al. |
| 6,416,744 B1 | 7/2002 | Robinson et al. |
| 6,428,827 B1 | 8/2002 | Song et al. |
| 6,471,945 B2 | 10/2002 | Luo et al. |
| 6,475,469 B1 | 11/2002 | Montgomery |
| 6,479,071 B2 | 11/2002 | Holme et al. |
| 6,485,739 B2 | 11/2002 | Luo et al. |
| 6,506,366 B1 | 1/2003 | Leinen et al. |
| 6,534,091 B1 | 3/2003 | Garces et al. |
| 6,555,145 B1 | 4/2003 | Cherukuri |
| 6,623,266 B2 | 9/2003 | Jani et al. |
| 6,627,233 B1 | 9/2003 | Wolf et al. |
| 6,673,844 B2 | 1/2004 | Kumamoto et al. |
| 6,685,916 B1 | 2/2004 | Holme et al. |
| 6,692,778 B2 | 2/2004 | Yatka et al. |
| 6,696,044 B2 | 2/2004 | Luo et al. |
| 6,759,066 B2 | 7/2004 | Savage et al. |
| 6,780,443 B1 | 8/2004 | Nakatsu et al. |
| 7,022,352 B2 | 4/2006 | Castro et al. |
| 7,025,999 B2 | 4/2006 | Johnson et al. |
| 7,189,760 B2 | 3/2007 | Erman et al. |
| 2002/0044968 A1 | 4/2002 | Van Lengerich |
| 2002/0054859 A1 | 5/2002 | Alvarez Hernandez |
| 2002/0119231 A1 | 8/2002 | Kumamoto et al. |
| 2002/0122842 A1 | 9/2002 | Seielstad et al. |
| 2002/0150616 A1 | 10/2002 | Vandecruys |
| 2003/0059519 A1 | 3/2003 | Merkel et al. |
| 2003/0077362 A1 | 4/2003 | Panhorst et al. |
| 2003/0091721 A1 | 5/2003 | Ohta et al. |
| 2003/0099740 A1 | 5/2003 | Colle et al. |
| 2003/0113274 A1 | 6/2003 | Holme et al. |
| 2003/0198710 A1* | 10/2003 | Ross et al. ................... 426/3 |
| 2003/0215532 A1 | 11/2003 | Nakatsu et al. |
| 2004/0136928 A1 | 7/2004 | Holme et al. |
| 2004/0146599 A1 | 7/2004 | Andersen et al. |
| 2004/0175489 A1 | 9/2004 | Clark et al. |
| 2004/0238993 A1 | 12/2004 | Benczedi et al. |
| 2005/0019445 A1 | 1/2005 | Wolf et al. |
| 2005/0025721 A1 | 2/2005 | Holme et al. |
| 2005/0112236 A1 | 5/2005 | Boghani et al. |
| 2005/0196517 A1 | 9/2005 | Hodanko et al. |
| 2005/0214348 A1 | 9/2005 | Boghani et al. |
| 2005/0220867 A1 | 10/2005 | Boghani et al. |
| 2005/0260266 A1 | 11/2005 | Gebreselassie et al. |
| 2006/0034897 A1 | 2/2006 | Boghani et al. |
| 2006/0068059 A1 | 3/2006 | Boghani et al. |
| 2006/0193896 A1 | 8/2006 | Boghani et al. |
| 2006/0263413 A1 | 11/2006 | Boghani et al. |
| 2006/0263472 A1 | 11/2006 | Boghani et al. |
| 2006/0263473 A1 | 11/2006 | Boghani et al. |
| 2006/0263477 A1 | 11/2006 | Boghani et al. |
| 2006/0263478 A1 | 11/2006 | Boghani et al. |
| 2006/0263479 A1 | 11/2006 | Boghani et al. |
| 2006/0263480 A1 | 11/2006 | Boghani et al. |
| 2007/0036733 A1 | 2/2007 | Spence et al. |
| 2007/0048424 A1 | 3/2007 | Moza et al. |
| 2007/0298061 A1 | 12/2007 | Boghani et al. |
| 2008/0063747 A1 | 3/2008 | Boghani et al. |
| 2008/0160138 A1 | 7/2008 | Boghani et al. |
| 2008/0166449 A1 | 7/2008 | Kabse et al. |
| 2008/0187621 A1 | 8/2008 | Boghani et al. |
| 2008/0199564 A1 | 8/2008 | Boghani et al. |
| 2009/0098252 A1 | 4/2009 | Boghani et al. |
| 2009/0175982 A1 | 7/2009 | Boghani et al. |
| 2009/0214445 A1 | 8/2009 | Boghani et al. |
| 2009/0220642 A1 | 9/2009 | Boghani et al. |

FOREIGN PATENT DOCUMENTS

| | | |
|---|---|---|
| CA | 2 238 925 | 11/1999 |
| CN | 1063798 | 8/1992 |
| DE | 19653100 | 7/1998 |
| EP | 0 067 595 | 12/1982 |
| EP | 0 132 444 | 2/1985 |
| EP | 0 134 120 | 3/1985 |
| EP | 0 252 374 | 1/1988 |
| EP | 0 255 260 | 2/1988 |
| EP | 0 434 321 | 6/1991 |
| EP | 0 452 273 | 10/1991 |
| EP | 0 453 397 | 10/1991 |
| EP | 0 608 712 | 8/1994 |
| EP | 0 888 067 | 7/1997 |
| EP | 1 121 927 | 8/2001 |
| EP | 1 215 258 | 6/2002 |
| EP | 1 003 475 | 1/2004 |
| ES | 2 080 703 | 2/1996 |
| ES | 2 190 875 | 8/2003 |
| GB | 875763 | 8/1961 |
| GB | 1 351 761 | 5/1974 |
| GB | 1444024 | 7/1976 |
| GB | 2 388 581 | 11/2003 |
| JP | 53-136566 | 11/1978 |
| JP | 62-215349 | 9/1987 |
| JP | 01-206969 | 8/1989 |
| JP | 02-083030 | 3/1990 |
| JP | 02083030 | 3/1990 |
| JP | 02-227044 | 9/1990 |
| JP | 2-258714 | 10/1990 |
| JP | 4-311365 | 11/1992 |
| JP | 6-14739 | 1/1994 |
| JP | 10-511104 | 10/1998 |
| JP | 2002-511777 | 4/2002 |
| JP | 2002-541123 | 12/2002 |
| RO | 85679 | 11/1984 |
| WO | WO 85/03414 | 8/1985 |
| WO | WO 88/00463 | 1/1988 |
| WO | WO 89/03170 | 4/1989 |
| WO | WO 89/11212 | 11/1989 |
| WO | WO 90/04926 | 5/1990 |
| WO | WO 90/07859 | 7/1990 |
| WO | WO 90/12512 | 11/1990 |
| WO | WO 90/13994 | 11/1990 |
| WO | WO 91/07104 | 5/1991 |
| WO | WO 92/02145 | 2/1992 |
| WO | WO 92/06160 | 4/1992 |
| WO | WO 93/23005 | 11/1993 |
| WO | WO 93/25177 | 12/1993 |
| WO | WO 95/07683 | 3/1995 |
| WO | WO 95/11671 | 5/1995 |
| WO | WO 95/33034 | 12/1995 |
| WO | WO 96/03109 | 2/1996 |
| WO | WO 96/08166 | 3/1996 |
| WO | WO 96/17524 | 6/1996 |
| WO | WO 96/19193 | 6/1996 |
| WO | WO 97/02009 | 1/1997 |

| | | |
|---|---|---|
| WO | WO 97/02011 | 1/1997 |
| WO | WO 97/02273 | 1/1997 |
| WO | WO 97/06695 | 2/1997 |
| WO | WO 97/06774 | 2/1997 |
| WO | WO 97/24036 | 7/1997 |
| WO | 98/03076 | 1/1998 |
| WO | WO 98/03076 | 1/1998 |
| WO | WO 98/15192 | 4/1998 |
| WO | 98/18610 | 5/1998 |
| WO | WO 98/18339 | 5/1998 |
| WO | WO 98/23165 | 6/1998 |
| WO | WO 98/29088 | 7/1998 |
| WO | WO 98/47483 | 10/1998 |
| WO | WO 98/47484 | 10/1998 |
| WO | WO 98/52540 | 11/1998 |
| WO | WO 98/52545 | 11/1998 |
| WO | WO 99/13870 | 3/1999 |
| WO | WO 99/15032 | 4/1999 |
| WO | WO 99/27798 | 6/1999 |
| WO | WO 99/43294 | 9/1999 |
| WO | WO 99/62354 | 12/1999 |
| WO | WO 00/01253 | 1/2000 |
| WO | WO 00/08092 | 2/2000 |
| WO | WO 00/35296 | 6/2000 |
| WO | WO 00/35398 | 6/2000 |
| WO | WO 00/36924 | 6/2000 |
| WO | 00/59543 | 10/2000 |
| WO | WO 00/69282 | 11/2000 |
| WO | WO 00/75274 | 12/2000 |
| WO | WO 01/49125 | 7/2001 |
| WO | WO 01/76384 | 10/2001 |
| WO | WO 02/00039 | 1/2002 |
| WO | WO 02/47489 | 6/2002 |
| WO | WO 02/055649 | 7/2002 |
| WO | WO 02/076231 | 10/2002 |
| WO | WO 02/102362 | 12/2002 |
| WO | WO 03/063604 | 8/2003 |
| WO | WO 03/106404 | 12/2003 |
| WO | 2004/005227 | 1/2004 |
| WO | WO 2004/006967 | 1/2004 |
| WO | WO 2004/064544 | 8/2004 |
| WO | WO 2004/077956 | 9/2004 |
| WO | WO 2005/016022 | 2/2005 |
| WO | WO 2005/051427 | 6/2005 |
| WO | WO 2005/079598 | 9/2005 |
| WO | WO 2005/082154 | 9/2005 |
| WO | WO 2005/087020 | 9/2005 |
| WO | WO 2005/091918 | 10/2005 |
| WO | WO 2006/003349 | 1/2006 |
| WO | WO 2006/039945 | 4/2006 |
| WO | WO 2006/079056 | 7/2006 |
| WO | WO 2006/086061 | 8/2006 |

OTHER PUBLICATIONS

Gantrez® AN; ISP Polymers for Oral Care; http://www.ispcorp.com/products/oralcare/content/brochure/oral/prod.html, printed Jun. 9, 2004, pp. 1-5.

Demmers et al.; Effect of Surfactants and Proteolytic Enzymes on Artificial Calculus Formation; Surfactants and Enzymes: Calculus; pp. 28-35.

Anonymous; "Caprol® 3GO CAS No. 9007-48-1" XP-002401201. Retrieved from the Internet: URL: http://www.abiteccorp.com/documents/3go-17_000.pdf [retrieved on Sep. 28, 2006].

Anonymous; "HLB Systems" [Online] pp. 1-4, XP-002401202. Retrieved from the Internet: URL: http://pharmcal.tripod.com/ch17.htm. [retrieved on Sep. 28, 2006].

J. Agric. Food Chem. 2004, 52, 8119-8126, Istabel Ovejero-López, Anne-Mette Haahr, Frans Van Den Berg, and Wender L.P. Bredie, Flavor Release Measurement from Gum Model System.

Rassing, M.R.; Chewing Gum as a Drug Delivery System, Advanced Drug Delivery Reviews, vol. 13 (1994); No. 1-2, pp. 89-121.

Leffingwell, John C. "Cool without Menthol & Cooler than Menthol and Cooling Compounds as Insect Repellents." From the Internet: URL: http://www.leffingwell.com/cooler_than_menthol.htm, [updated Apr. 5, 2006].

* cited by examiner

THERMALLY STABLE, HIGH TENSILE STRENGTH ENCAPSULATED ACTIVES

CROSS-REFERENCE TO RELATED APPLICATIONS

This application is a continuation-in-part of both U.S. application Ser. No. 10/955,149, filed Sep. 30, 2004 and U.S. application Ser. No. 10/955,225, filed Sep. 30, 2004, the contents all of which are incorporated herein by reference.

FIELD

Included are thermally stabilized encapsulated compositions. The thermally stabilized compositions include an active which resists degradation or decomposition at higher temperatures such as the temperatures required for extrusion of the thermally stabilized compositions with a high molecular weight polymer.

BACKGROUND

Encapsulated intense sweeteners have a particular advantage when included in gum compositions such as chewing gum and bubble gum compositions. The encapsulated sweeteners are not immediately released as sugar would be when included in a chewing gum. By contrast, an encapsulated sweetener composition provides extended sweetening on chewing because the sweetener is not released until the encapsulating material has been subjected to mastication.

Intense sweeteners such as aspartame (APM) and acesulfame potassium (Ace-K) have been used in encapsulated compositions in combination with high molecular weight polymers which allow for their slow release upon chewing in a gum composition.

Sucralose is another popular intense sweetener which is derived from sucrose in which one or more hydroxy groups are replaced by chlorine atoms. This compound is described in U.K. Patent No. 1,543,167, the disclosure of which is incorporated herein by reference. Sucralose may be referred to by different chemical names including: 4-chloro-4-deoxy-α-D-galactopyranosyl, 1,6-dichloro1,6-dideoxy-β-D-fructofuranoside, and known as 4,1',6',-trichloro-4,1',6'-trideoxygalactosucrose.

Sucralose is relatively stable and inert. This stability includes exhibiting stability in acid aqueous solutions, in marked contrast to peptide-based sweeteners such as aspartame. Under completely dry conditions, however, sucralose which is present in a crystalline form tends to discolor in response to elevated temperatures. For example, such discoloration can be exhibited after twenty minutes of exposure of pure dry sucralose to a temperature of 100° C., wherein the color changes to a pale brown. This degradation of sucralose results in a commercially unacceptable product. This high temperature instability of sucralose has made it commercially impractical to prepare an encapsulated sucralose with the extrusion techniques used to prepare the encapsulated APM and Ace-K compositions.

The heat stability issues of sucralose were addressed in U.S. Pat. No. 4,971,797 to Cherukuri, et al. Cherukuri provides a method of preparing a co-crystallized/precipitated complex of cyclodextrin and sucralose which reduces the degradation of the sucralose when the complex is exposed to heat. The method of Cherukuri uses an organic solvent, such as methanol, in the co-crystallization in order to allow the method to be conducted at room temperature. The co-crystallized/precipitated complex must then be subjected to an additional process step to ensure removal of the methanol, a highly toxic material. Proper handling and disposal of methanol is also required in such a process and is undesirable in view of environmental concerns.

There is a need for an encapsulated sucralose composition having enhanced stability and which may be used in a variety of compositions including gum compositions.

The compositions of some embodiments are designed to enhance the stability of actives contained therein and to make them more resistant to heat both during processing and during storage.

SUMMARY

Some embodiments include a thermally stabilized active composition and a high molecular weight polymer which at least partially encapsulates the thermally stabilized active compositions. One benefit provided by the thermally stabilized active composition is that it has enhanced resistance to degradation of the active at high temperatures.

In some embodiments there is an encapsulated sweetener composition which may be provided by:
(a) preparing a thermally stabilized sucralose composition;
(b) combining said thermally stabilized sucralose composition with a polymer;
(c) melting and extruding said thermally stabilized sucralose composition with said polymer to provide an encapsulated sucralose composition; and
(d) forming said encapsulated sucralose composition to a suitable particle size Also provided is a method of preparing an encapsulated active composition including:
(a) preparing a thermally stabilized active composition;
(b) combining said thermally stabilized active composition with a polymer;
(c) melting and extruding the thermally stabilized active composition with the polymer providing an encapsulated active composition; and
(d) forming said encapsulated active composition to a suitable particle size.

In some embodiments there is a gum composition including:
(a) a gum base; and
(b) an at least partially encapsulated sweetener composition comprising:
(i) a thermally stabilized sucralose composition; and
(ii) a high molecular weight polymer, said polymer at least partially encapsulating said thermally stabilized sucralose composition.

In some embodiments there is a method of preparing an encapsulated active comprising combining a thermally stable active composition with a polymer followed by melting and extruding the combination of the thermally stabilized active and the polymer to provide an encapsulated active composition.

DETAILED DESCRIPTION

As used herein the transitional term "comprising," (also "comprises," etc.) which is synonymous with "including," "containing," or "characterized by," is inclusive or open-ended and does not exclude additional, unrecited elements or method steps, regardless of its use in the preamble or the body of a claim.

As used herein, the terms "bubble gum" and "chewing gum" are used interchangeably and are both meant to include any gum compositions.

As used herein, the term "active" refers to any composition which may be included in the encapsulated compositions of some embodiments, wherein the active provides some desirable property upon release from encapsulation. Examples of suitable actives include sweeteners, such as sucralose, flavors, breath fresheners, sensates such as coolers, warmer and spicy components, medicaments, vitamins, and combinations thereof.

As used herein, the term "thermally stabilized active" refers to an active which has been treated to allow the active to be subjected to higher temperatures without decomposition, degradation, and/or discoloration of the active. These temperatures are higher than the temperatures at which the free or untreated actives would normally begin to decompose, degrade, and/or discolor.

The thermally stabilized composition of some embodiments may include an active which resists decomposition or degradation at high temperatures. The thermally stabilized composition may be prepared by different methods such as encapsulation or complexation.

The encapsulated composition of some embodiments includes a thermally stabilized active composition in combination with an encapsulating polymer. Since the thermally stabilized active composition is resistant to heat degradation compared with free active, especially wherein the active is sucralose, thermally stabilized active composition may be combined with the polymer by melt extrusion. This provides an encapsulated composition which is suitable for use in a variety of confectionary products including gum compositions. The active may be present in any desired amount such as from about 5% to about 50% by weight of the encapsulated composition.

A variety of different sweeteners may be used in the compositions of some embodiments. These sweeteners may be selected from a wide range of materials including water-soluble sweeteners, water-soluble artificial sweeteners, water-soluble sweeteners derived from naturally occurring water-soluble sweeteners, dipeptide based sweeteners, and protein based sweeteners, including mixtures thereof. Without being limited to particular sweeteners, representative categories and examples include:

(a) water-soluble sweetening agents such as dihydrochalcones, monellin, steviosides, glycyrrhizin, dihydroflavenol, monatin, and sugar alcohols such as sorbitol, mannitol, maltitol, and L-aminodicarboxylic acid aminoalkenoic acid ester amides, such as those disclosed in U.S. Pat. No. 4,619,834, which disclosure is incorporated herein by reference, and mixtures thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and mixtures thereof;

(c) dipeptide based sweeteners, such as L-aspartic acid derived sweeteners, such as L-aspartyl-L-phenylalanine methyl ester (Aspartame) and materials described in U.S. Pat. No. 3,492,131, L-alphaaspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, Neotame and mixtures thereof;

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-dideoxygalactosucrose; 1',6'-dichloro1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galacto-pyranosyl-1,6-dichloro-1,6-dideoxy-beta-D-fructofuranoside, or 4,6,1',6'-tetrachloro-4,6,1',6'-tetradeoxygalacto-sucrose; and 4,6,1',6'-tetradeoxysucrose, and mixtures thereof; and (e) protein based sweeteners such as thaumaoccous danielli (Thaumatin I and II).

The intense sweetening agents may be used in many distinct physical forms well-known in the art to provide an initial burst of sweetness and/or a prolonged sensation of sweetness. Without being limited thereto, such physical forms include free forms, such as spray dried, powdered, beaded forms, encapsulated forms, and mixtures thereof.

The thermally stabilized active compositions useful in some embodiments include a combination of a desired active such as sucralose in combination with other components. The combination of the active with the other components allow the active to resist decomposition when exposed to high temperatures such as 100° C. where free sucralose would begin to discolor. The thermally stabilized active composition may be prepared by a variety of methods which include the preparation of a co-crystallized/precipitated complex of an active and cyclodextrin, adding a coating to an active by a spray coating method, and extruding an active with a low to medium molecular weight polymer at a temperature below the decomposition temperature of the active.

Co-Crystallized/Precipitated Complex

The co-crystallized/precipitated complex of some embodiments may primarily include an active, such as sucralose, with cyclodextrin. Within the co-crystallized/precipitated complex, the cyclodextrin may be present in an amount greater than zero up to about 25% by weight of the complex, more specifically up to about 15% or up to about 5%. The cyclodextrin may be any of α-cyclodextrin, β-cyclodextrin, γ-cyclodextrin, and combinations thereof.

A co-crystallized/precipitated complex of sucralose and cyclodextrin may be prepared by first preparing a solution in water or a combination of water with another suitable organic solvent. The solution is then heated to a temperature in the range from about 40° C. to about 80° C. for about 10 minutes to about 20 minutes. The heating of the solution has been found not to result in an appreciable degradation of a sucralose active, as measured by changed in color, i.e., discoloration as measured by spectrophotometry, as described below in the examples.

After the sucralose/cyclodextrin solution has been maintained under heat for a sufficient time to form the co-crystallized/precipitated complex of sucralose and cyclodextrin, the co-crystallized/precipitated complex is then obtained upon drying or otherwise removing the solvent. If necessary, the particles obtained after drying may be formed to a desired size. This may be accomplished by any mechanical means such as milling, grinding, or other methods of comminuting. In some embodiments the co-crystallized/precipitated complex has an average particle size ranging from about 1 μm to about 150 μm.

Encapsulated Active by Spray Coating

A thermally stabilized active composition may also be prepared by coating the active by a spray coating method. This process provides an active which is at least partially encapsulated by a polymer such as polyvinyl acetate.

The coating layer which surrounds the active, may also include a solvent which should be capable of dissolving the polymer. The solvent may be any solvent known for this purpose. For example, if the polymer is polyvinyl acetate, suitable solvents include of ethyl acetate, diethyl ether, acetone, benzene, ethylene dichloride, methanol, methyl ethyl ketone, ethanol, toluene, xylene, amyl acetate, and combinations thereof.

One or more coating layers may be present which include the encapsulating polymer and optionally may include the same or a different active. In some embodiments wherein more than one coating layer is present, the first coating layer may include a high tensile strength polymer with the optional addition of another active such as a sweetener. A second coating may completely or partially encapsulate the active particles and may include either a single polymer, a combination of different polymers, or a combination of one or more polymers and a sweetener such as sucralose.

Polymers which may be used in the coating layers include acrylic polymers and copolymers, carboxyvinyl polymer, polyamides, polystyrene, polyvinyl acetate, polyvinyl acetate phthalate, polyvinylpyrrolidone, and combinations thereof. One or more different polymers may be used in each of the coating layers. For example, polyvinyl acetate may be included in a first coating with a combination of polyvinyl acetate and another polymer in a subsequent exterior coating.

The encapsulated particles of some embodiments may be prepared by any suitable spray coating method as known in the art. One suitable process is the Wurster process. This process provides a method for encapsulating individual particulate materials. First the particles to be encapsulated are suspended in a fluidizing air stream which provides a generally cyclic flow in front of a spray nozzle. The spray nozzle sprays an atomized flow of the coating solution, which may include sucralose, a polymer and a suitable solvent.

The atomized coating solution collides with the particles as they are carried away from the nozzle to provide a particle coating with the coating solution. The temperature of the fluidizing air stream, which also serves to suspend the particles to be coated, may be adjusted to evaporate the solvent shortly after the coating solution contacts the particles. This serves to solidify the coating on the particles, resulting in the desired encapsulated particle.

This process may be repeated until the desired thickness of the coating is achieved. Alternatively, the process may be repeated with a different coating solution to provide different and distinct coating layers in the encapsulated particle composition.

Following the coating process, the particles may then be formed to an appropriate size as desired, generally from an average particle size range of about 50 μm to about 800 μm. This may be accomplished by any suitable means such as chopping, pulverizing, milling or grinding the particles.

Encapsulated Active by Extrusion

The active may also be extruded with a low to medium molecular weight polymer to achieve a thermally stabilized active composition. The polymer may be any of those described herein. The molecular weight of the polymer may be less than about 300,000, specifically from about 9,000 to about 200,000 and may be polyvinyl acetate.

In one method of preparing the extruded thermally stabilized active, the active is first combined with the polymer and melted. The combination of active and polymer may then be extruded, cooled and formed to the desired particle size. The particles may be sized by milling, grinding, pulverizing, etc. to achieve a particle an average particle size from about 50 μm to about 800 μm.

Combination of Thermally Stabilized Composition and Polymer

The thermally stabilized active composition may then be encapsulated in a high molecular weight or high tensile strength polymer. The thermally stabilized active composition may be prepared by any of the methods described hereinabove. Combinations of thermally stabilized active compositions, including combinations of different actives and combinations of compositions prepared by different may be combined.

Examples of suitable polymers for the encapsulation of the thermally stabilized active compositions include polyethylene, crosslinked polyvinyl pyrrolidone, polymethylmethacrylate, polylacticacid, polyhydroxyalkanoates, ethylcellulose, polyvinyl acetate phthalate, polyethyleneglycol esters, methacrylicacid-co-methylmethacrylate, acrylic polymers and copolymers, carboxyvinyl polymer, polyamides, polystyrene, polyvinyl acetate and combinations thereof, more specifically the polymer will include polyvinyl acetate either alone or in combination with another polymer. For example, the polymer may have a molecular weight higher than about 300,000, specifically about 500,000 or higher.

The thermally stabilized active composition may be combined with the encapsulating polymer by melt extrusion. This is conducting by melting a combination of one or more polymers in combination with the active composition in the temperature range of about 65° C. to about 140° C. Another sweetener, such as a high-intensity sweetener as described above may be added prior to melting the combination. The extrudate is then cooled and formed into particles of a desired size. This may be accomplished through cutting, grinding, pulverizing, milling or any other appropriate technique as know in the art. The extrudate particles may have an average particle size ranging from about 50 μm to about 800 μm.

The encapsulated active composition may include any desired combination of polymer and the active composition, in addition to an optionally added active, especially a sweetener. The active composition may be present in an amount from about 5% to about 50% by weight of the encapsulated sweetener composition.

The encapsulated active compositions as described herein may also be used in a gum composition, including but not limited to chewing gums and bubble gums, particularly where the active is sucralose or another sweetener. Encapsulation of the sweetener provides advantages in the preparation of gum compositions by providing an enhanced or prolonged sweetening perception to person who is chewing the gum. This perception results from the manner in which the sweetener is released over time as a result of the gum being chewed.

A sweetener composition may be used in any amount suitable for the desired sweetening effect to be achieved. In general, an effective amount of sweetener may be utilized to provide the level of sweetness desired, and this amount may vary especially when a sweetener is selected in addition to the encapsulated sweetener or wherein a sweetener is added in addition to the encapsulated sweetener. The amount of sweetener may be present in amounts from about 0.001% to about 3%, by weight of the gum composition, depending upon the sweetener or combination of sweeteners used. The exact range of amounts for each type of sweetener may be selected by those skilled in the art.

The gum compositions of some embodiments may include a gum base. The gum base may include any component known in the chewing gum art. For example, the gum composition may include elastomers, bulking agents, waxes, elastomer solvents, emulsifiers, plasticizers, fillers and mixtures thereof.

The elastomers (rubbers) employed in the gum base will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and combinations thereof. Examples of synthetic elastomers include, without limitation, styrene-butadiene copolymers (SBR), polyisobutylene, isobutylene-isoprene copolymers, polyethylene, polyvinyl acetate and the like, and combinations thereof.

Additional useful polymers include: crosslinked polyvinyl pyrrolidone, polymethylmethacrylate; copolymers of lactic acid, polyhydroxyalkanoates, plasticized ethylcellulose, polyvinyl acetatephthalate and combinations thereof.

The amount of elastomer employed in the gum base may vary depending upon various factors such as the type of gum base used, the consistency of the gum composition desired and the other components used in the composition to make the final chewing gum product. In general, the elastomer will be present in the gum base in an amount from about 10% to about 60% by weight of the gum region, desirably from about 35% to about 40% by weight.

In some embodiments, the gum base may include wax. It softens the polymeric elastomer mixture and improves the elasticity of the gum base. When present, the waxes employed will have a melting point below about 60° C., and preferably between about 45° C. and about 55° C. The low melting wax may be a paraffin wax. The wax may be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnuba wax, most petroleum waxes, and the like, and mixtures thereof.

In addition to the components set out above, the gum base may include a variety of other ingredients, such as components selected from elastomer solvents, emulsifiers, plasticizers, fillers, and mixtures thereof.

The gum base may contain elastomer solvents to aid in softening the elastomer component. Such elastomer solvents may include those elastomer solvents known in the art, for example, terpinene resins such as polymers of alpha-pinene or beta-pinene, methyl, glycerol and pentaerythritol esters of rosins and modified rosins and gums such as hydrogenated, dimerized and polymerized rosins, and mixtures thereof. Examples of elastomer solvents suitable for use herein may include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifiers which aid in dispersing the immiscible components into a single stabilized system. The emulsifiers useful in this invention include glyceryl monostearate, lecithin, fatty acid monoglycerides, diglycerides, propylene glycol monostearate, and the like, and mixtures thereof. The emulsifier may be employed in amounts from about 2% to about 15%, and more specifically, from about 7% to about 11%, by weight of the gum base.

The gum base may also include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 20% by weight of the gum base, and more specifically in amounts from about 9% to about 17%, by weight of the gum base.

Plasticizers also include are the hydrogenated vegetable oils and include soybean oil and cottonseed oil which may be employed alone or in combination. These plasticizers provide the gum base with good texture and soft chew characteristics. These plasticizers and softeners are generally employed in amounts from about 5% to about 14%, and more specifically in amounts from about 5% to about 13.5%, by weight of the gum base.

Anhydrous glycerin may also be employed as a softening agent, such as the commercially available United States Pharmacopeia (USP) grade. Glycerin is a syrupy liquid with a sweet warm taste and has a sweetness of about 60% of that of cane sugar. Because glycerin is hygroscopic, the anhydrous glycerin may be maintained under anhydrous conditions throughout the preparation of the chewing gum composition.

In some embodiments, the gum base of this invention may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, calcium sulfate and the like, and mixtures thereof. These fillers or adjuvants may be used in the gum base compositions in various amounts. The amount of filler, may be present in an amount from about zero to about 40%, and more specifically from about zero to about 30%, by weight of the gum base.

A variety of traditional ingredients may be optionally included in the gum base in effective amounts such as coloring agents, antioxidants, preservatives, flavoring agents, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base.

The gum composition may include amounts of conventional additives selected from the group consisting of sweetening agents (sweeteners), plasticizers, softeners, emulsifiers, waxes, fillers, bulking agents (carriers, extenders, bulk sweeteners), mineral adjuvants, flavoring agents (flavors, flavorings), coloring agents (colorants, colorings), antioxidants, acidulants, thickeners, medicaments, and the like, and mixtures thereof. Some of these additives may serve more than one purpose. For example, in sugarless gum compositions, a sweetener, such as maltitol or other sugar alcohol, may also function as a bulking agent.

The plasticizers, softening agents, mineral adjuvants, waxes and antioxidants discussed above, as being suitable for use in the gum base, may also be used in the chewing gum composition. Examples of other conventional additives which may be used include emulsifiers, such as lecithin and glyceryl monostearate, thickeners, used alone or in combination with other softeners, such as methyl cellulose, alginates, carrageenan, xanthan gum, gelatin, carob, tragacanth, locust bean gum, pectin, alginates, galactomannans such as guar gum, carob bean gum, glucomannan, gelatin, starch, starch derivatives, dextrins and cellulose derivatives such as carboxy methyl cellulose, acidulants such as malic acid, adipic acid, citric acid, tartaric acid, fumaric acid, and mixtures thereof, and fillers, such as those discussed above under the category of mineral adjuvants.

In some embodiments, the gum region may also contain a bulking agent. Suitable bulking agents may be water-soluble and include sweetening agents selected from, but not limited to, monosaccharides, disaccharides, polysaccharides, sugar alcohols, and mixtures thereof; randomly bonded glucose polymers such polydextrose available under the trade name LITESSE manufactured by Danisco Sweeteners, Terre Haute, Ind.; isomalt (a racemic mixture of alpha-D-glucopyranosyl-1,6-mannitol and alpha-D-glucopyranosyl-1,6-sorbitol manufactured under the trade name PALATINIT by Suddeutsche Zucker), maltodextrins; hydrogenated starch hydrolysates; hydrogenated hexoses; hydrogenated disaccharides; minerals, such as calcium carbonate, talc, titanium dioxide, dicalcium phosphate; celluloses; and mixtures thereof.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof.

Suitable sugar alcohol bulking agents include sorbitol, erythritol, xylitol, mannitol, galactitol, maltitol, and mixtures thereof.

Suitable hydrogenated starch hydrolysates include those disclosed in U.S. Pat. Nos. 25,959, 3,356,811, 4,279,931 and various hydrogenated glucose syrups and/or powders which contain sorbitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN, a commercially available product manufactured by Roquette Freres of France, and HYSTAR, a commercially available product manufactured by Lonza, Inc., of Fairlawn, N.J., are also useful.

Any sweetening agent, as described above, may also be added as an additional, optional, and independent component to the gum compositions.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, spearmint, artificial vanilla, cinnamon derivatives, and various fruit flavors, whether employed individually or in admixture. Flavors may also provide breath freshening properties, particularly the mint flavors when used in combination with the cooling agents, described herein below.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing, publication 1274, pages 63-258, by the National Academy of Sciences, may be used. This publication is incorporated herein by reference. This may include natural as well as synthetic flavors.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, and mixtures thereof.

In some embodiments, the flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well-known.

In some embodiments, the flavoring agents may be used in many distinct physical forms well-known in the art to provide an initial burst of flavor and/or a prolonged sensation of flavor. Without being limited thereto, such physical forms include free forms, such as spray dried, powdered, beaded forms, encapsulated forms, and mixtures thereof.

The amount of flavoring agent employed herein may be a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5%, and more specifically from about 0.1% to about 2%, and even more specifically, from about 0.8% to about 1.8%, by weight of the chewing gum composition.

With respect to cooling agents, a variety of well known cooling agents may be employed. For example, among the useful cooling agents are included menthol, xylitol, menthane, menthone, ketals, menthone ketals, menthone glycerol ketals, substituted p-menthanes, acyclic carboxamides, substituted cyclohexanamides, substituted cyclohaxane carboxamides, substituted ureas and sulfonamides, substituted menthanols, hydroxymethyl and hydroxymethyl derivatives of p-menthane, 2-mercapto-cyclo-decanone, 2-isoprpanyl-5-methylcyclohexanol, hydroxycarboxylic acids with 2-6 carbon atoms, cyclohexanamides, menthyl acetate, menthyl lactate, menthyl salicylate, N,2,3-trimethyl-2-isopropyl butanamide (WS-23), N-ethyl-p-menthane-3-carboxamide (WS-3), menthyl succinate, 3,1-menthoxypropane 1,2-diol, among others. These and other suitable cooling agents are further described in the following U.S. patents, all of which are incorporated in their entirety by reference hereto: U.S. Pat. Nos. 4,230,688 and 4,032,661 to Rowsell et al.; U.S. Pat. No. 4,459,425 to Amano et al.; U.S. Pat. No. 4,136,163 to Watson et al.; U.S. Pat. No. 5,266,592 to Grub et al.; and U.S. Pat. No. 6,627,233 to Wolf et al. These cooling agents may be present in one or more of the outer gum coatings, the gum region surrounding the liquid fill, the liquid fill per se, or in any combination of those three gum areas. Cooling agents, when used in the outer coating composition for the gum, are generally present in amount of 0.01% to about 1.0%. When used in the other portions of the gum, such as the gum region or the center fill, they may be present in amounts of about 0.001 to about 10% by weight of the total chewing gum piece.

Warming components may be selected from a wide variety of compounds known to provide the sensory signal of warming to the user. These compounds offer the perceived sensation of warmth, particularly in the oral cavity, and often enhance the perception of flavors, sweeteners and other organoleptic components. Among the useful warming compounds included are vanillyl alcohol n-butylether (TK-1000) supplied by Takasago Perfumary Company Limited, Tokyo, Japan, vanillyl alcohol n-propylether, vanillyl alcohol isopropylether, vanillyl alcohol isobutylether, vanillyl alcohol n-aminoether, vanillyl alcohol isoamyleather, vanillyl alcohol n-hexyleather, vanillyl alcohol methylether, vanillyl alcohol ethyleather, gingerol, shogaol, paradol, zingerone, capsaicin, dihydrocapsaicin, nordihydrocapsaicin, homocapsaicin, homodihydrocapsaicin, ethanol, isopropyl alcohol, iso-amylalcohol, benzyl alcohol, glycerine, and combinations thereof.

The sensation of warming or cooling effects may be prolonged with the use of a hydrophobic sweetener as described in U.S. Patent Application Publication 2003/0072842 A1 to Johnson et al. which is incorporated in its entirety herein by reference. For example, such hydrophobic sweeteners include those of the formulae I-XI referenced therein. Perillartine may also be added as described in U.S. Pat. No. 6,159,509 also incorporated in its entirety herein by reference.

The breath freshening agents may include in addition to the flavors and cooling agents described hereinabove, a variety of compositions with odor controlling properties. These may include, without limitation, cyclodextrin and magnolia bark extract. The breath freshening agents may further be encapsulated to provide a prolonged breath freshening effect. Examples of malodor-controlling compositions are included in U.S. Pat. No. 5,300,305 to Stapler et al. and in U.S. Patent Application Publication Nos. 2003/0215417 and 2004/0081713 which are incorporated in their entirety herein by reference Coloring agents may be used in amounts effective to produce the desired color. The coloring agents may include pigments which may be incorporated in amounts up to about 6%, by weight of the gum composition. For example, titanium dioxide may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No. 2, which is the disodium salt of 5,5-indigotindisulfonic acid. Similarly, the dye known as F.D.& C. Green No. 1 comprises a triphenylmethane dye and is the monosodium salt of 4-[4-(N-ethyl-p-sulfoniumbenzylamino) diphenylmethylene]-[1-(N-ethyl-N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857-884, which text is incorporated herein by reference.

Suitable oils and fats usable in gum compositions include partially hydrogenated vegetable or animal fats, such as coconut oil, palm kernel oil, beef tallow, and lard, among others. These ingredients when used are generally present in amounts up to about 7%, and preferably up to about 3.5%, by weight of the gum composition.

Some embodiments may include a method for preparing the improved chewing gum compositions for the gum region, including both chewing gum and bubble gum compositions. The chewing gum compositions may be prepared using standard techniques and equipment known to those skilled in the art. The apparatus useful in accordance with some embodiments comprises mixing and heating apparatus well known in the chewing gum manufacturing arts, and therefore the selection of the specific apparatus will be apparent to the artisan.

Any of a variety of active ingredients may be included in any of the embodiments described herein. The active may be included in the extruded composition or alternatively in a gum composition. Examples of actives include sweetener, flavors, and breath-freshening agents (as described above), medicaments such as analgesics, anti-histamines, decongestants, and antacids, and vitamins.

A variety of drugs, including medications, herbs, and nutritional supplements may also be included as the active. Examples of useful drugs include ace-inhibitors, antianginal drugs, anti-arrhythmias, anti-asthmatics, anti-cholesterolemics, analgesics, anesthetics, anti-convulsants, anti-depressants, anti-diabetic agents, anti-diarrhea preparations, antidotes, anti-histamines, anti-hypertensive drugs, anti-inflammatory agents, anti-lipid agents, anti-manics, anti-nauseants, anti-stroke agents, anti-thyroid preparations, anti-tumor drugs, anti-viral agents, acne drugs, alkaloids, amino acid preparations, anti-tussives, anti-uricemic drugs, anti-viral drugs, anabolic preparations, systemic and non-systemic anti-infective agents, anti-neoplastics, anti-parkinsonian agents, anti-rheumatic agents, appetite stimulants, biological response modifiers, blood modifiers, bone metabolism regulators, cardiovascular agents, central nervous system stimulates, cholinesterase inhibitors, contraceptives, decongestants, dietary supplements, dopamine receptor agonists, endometriosis management agents, enzymes, erectile dysfunction therapies such as sildenafil citrate, which is currently marketed as Viagra®, fertility agents, gastrointestinal agents, homeopathic remedies, hormones, hypercalcemia and hypocalcemia management agents, immunomodulators, immunosuppressives, migraine preparations, motion sickness treatments, muscle relaxants, obesity management agents, osteoporosis preparations, oxytocics, parasympatholytics, parasympathomimetics, prostaglandins, psychotherapeutic agents, respiratory agents, sedatives, smoking cessation aids such as bromocryptine or nicotine, sympatholytics, tremor preparations, urinary tract agents, vasodilators, laxatives, antacids, ion exchange resins, anti-pyretics, appetite suppressants, expectorants, anti-anxiety agents, anti-ulcer agents, anti-inflammatory substances, coronary dilators, cerebral dilators, peripheral vasodilators, psycho-tropics, stimulants, anti-hypertensive drugs, vasoconstrictors, migraine treatments, antibiotics, tranquilizers, anti-psychotics, anti-tumor drugs, anti-coagulants, anti-thrombotic drugs, hypnotics, anti-emetics, anti-nauseants, anti-convulsants, neuromuscular drugs, hyper- and hypo-glycemic agents, thyroid and anti-thyroid preparations, diuretics, anti-spasmodics, terine relaxants, anti-obesity drugs, erythropoietic drugs, anti-asthmatics, cough suppressants, mucolytics, DNA and genetic modifying drugs, and combinations thereof.

The features and advantages of the present invention are more fully shown by the following examples which are provided for purposes of illustration, and are not to be construed as limiting the invention in any way.

EXAMPLES

Example 1

Co-Crystallized/Precipitated Complex

General steps followed for preparing the co-crystallized/precipitated compositions included the following procedure. First, a quantity of β cyclodextrin was added to sucralose and the resulting mixture was then dissolved in 25 ml. water and heated to 80° C. for one hour. The solution was then cooled to 20° C. and allowed to crystallize overnight under refrigeration. The crystalline precipitate was then filtered off by cold-filtration, air-dried, and then milled to a uniform particle size.

In particular, a series of samples of co-crystalline complexes were prepared for testing. Accordingly, 0.25 g, 0.5 g and 1.0 g of cyclodextrin were added to sucralose to prepare a total of 5 g of mixture in accordance with the general procedure above. The samples thus corresponded to mixtures containing 5%, 10% and 20% cyclodextrin. As a comparison, a sample containing pure sucralose was prepared in the same manner, and was likewise milled identically to eliminate any particle size differences.

The co-crystallized/precipitated particles prepared above were combined with polyvinyl acetate (PVAc) and were extruded at a temperature of about 195° F. (92° C.) to provided an extruded sucralose composition. The changes of color (discoloration) of extruded the sucralose compositions were measured by taking diffuse reflectance absorbance readings with a Minolta spectrophotometer of the respective samples. The results are set forth in Table 1.

Referring to Table 1, it is apparent that significant improvement in color is obtained with cyclodextrin stabilized sucralose/PVAc extrudate as compared to free sucralose/PVAc extrudate.

Measurement of Discoloration/Degradation of Extruded Sucralose

The change of color of extruded sucralose compositions were measured by taking Diffuse Reflectance Absorbance readings with a Minolta spectrophotometer model no. CR-321. Absorbance measurement over the entire visible color spectrum were obtained using the International Commission on Illumination (CIE) CIE L*a*b*ΔE color difference formula (CIELab color scale). This scale quantifies color according to a 3 parameters, L* (lightness-darkness scale), a* (red-green chroma), and b* (yellow-blue chroma). The overall change in the color of the encapsulated sucralose composition was calculated using the CIELAB equation $\Delta E = [(\Delta L^*)^2 + (\Delta a^*)^2 + (\Delta b^*)^2]^{1/2}$. The ΔE value summarizes the overall change for each color factor ($\Delta L^* = (L_f^* - L_i^*)$, $\Delta a^* = a_f^* - a_i^*$), and $\Delta b^* = (b_f^* - b_i^*)$) and represents the ability of the cyclodextrin to prevent browning which is related to decomposition of sucralose. In order to obtain reproducible readings, measurements were conducted by aligning the center of the 4 mm square segment of encapsulated sucralose composition directly over the 3 mm diameter targeting aperture of the Minolta spectrophotometer. An average of 3 absorbance readings using the L*, a*, and b* scale were taken for each sucralose composition. There was a significant difference between cyclodextrin-sucralose versus free sucralose extrudates, 83.74 being whiter than 76.43. For Delta b*, which is a measure of brown color, there was also significant difference between cyclodextrin-sucralose and free sucralose 6.89 being more brown as compared to 2.26.

TABLE 1

The change of color of extruded sucralose compositions

|  | $L_i^*$ | $a_i^*$ | $b_i^*$ | $L_f^*$ | $a_f^*$ | $b_f^*$ | ΔE |
|---|---|---|---|---|---|---|---|
| Free sucralose-PVAc composition | 94.74 | −0.74 | 0.22 | 76.43 | 0.29 | 6.89 | 19.50 |
| β-Cyclodextrin stabilized Sucralose-PVAc composition | 94.74 | −0.74 | 0.22 | 83.71 | 0.29 | 2.26 | 10.50 |

Example 2

Extrusion of Active with Polymer

Another method of preparing a thermally stabilized active composition is to first combine the active, such as sucralose with a low to medium molecular weight polymer prior to extrusion with a high molecular weight polymer.

The compositions for comparative Example 3A and inventive example 3B are set forth in Table 2.

TABLE 2

Compositions for Extruded Sucralose

| Component | Example 3A | Example 3B |
|---|---|---|
| | Weight % | |
| Step 1 | | |
| Polyvinyl acetate (B100)[1] | 65.00 | |
| Polyvinyl acetate (B17)[2] | 23.10 | 23.10 |
| Hydrogenated Oil | 4.65 | 0.90 |
| Glycerolmonostearate | 1.25 | |
| Sucralose | 6.00 | 6.00 |
| Step 2 | | |
| Polyvinyl acetate (B100) | | 65.00 |
| Hydrogenated oil | | 3.75 |
| Glycerolmonostearate | | 1.25 |

[1]High Molecular Weight - approx. 500,000
[2]Medium Molecular Weight - approx. 100,000

For comparative Example 3A, all the ingredients were mixed and extruded from a laboratory twin screw extruder at a temperature of about 110° C. The mixing and extrusion steps were conducted in a single step. The process resulted in a dark-brown product which is evidence of decomposition of the sucralose.

For inventive Example 3B, the components shown in step 1 were mixed and extruded from a laboratory twin screw extruder at temperature of about 80° C. The resulting sucralose/polymer matrix was then cooled, ground and sized (590 microns screen). HPLC analysis on the encapsulated sucralose showed now decomposition.

The composition resulting from Example 3B, step 1, were added to the components for step 2, mixed, and extruded from a laboratory twin screw extruder at t temperature of about 110° C. The resulting white color sucralose/polymer matrix was cooled, ground and sized (590 microns screen). HPLC analysis on the high strength encapsulation showed no decomposition.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

The invention claimed is:

1. A gum composition comprising:
a composition comprising a heat-sensitive active and a first polymer having a molecular weight from about 9,000 to about 200,000, wherein the heat-sensitive active is at least partially encapsulated by the first polymer; and
a second encapsulating layer comprising a second polymer having a molecular weight higher than about 300,000, wherein the composition comprising the heat-sensitive active and the first polymer having a molecular weight from about 9,000 to about 200,000 is encapsulated in the second encapsulating layer.

2. The gum composition of claim 1, wherein said active comprises sucralose.

3. The gum composition of claim 1, wherein said polymer having a molecular weight higher than about 300,000 is selected from the group consisting of acrylic polymers and copolymers, carboxyvinyl polymer, polyamides, polystyrene, polyvinyl acetate, polyvinyl acetate phthalate, polyvinyl pyrrolidone, and combinations thereof.

4. The gum composition of claim 1, wherein said composition comprising the heat-sensitive active, the first polymer, and the second polymer has an average particle size ranging from about 50 μm to about 800 μm.

5. The gum composition of claim 1, wherein said composition comprising the heat-sensitive active, the first polymer, and the second polymer is present in an amount from about 5% to about 50% of said gum composition.

6. An encapsulated sweetener composition provided by:
(a) preparing a thermally stabilized sucralose composition comprising sucralose and a polymer having a molecular weight from about 9,000 to about 200,000; wherein the sucralose is at least partially encapsulated by the polymer;
(b) combining said thermally stabilized sucralose composition with a high molecular weight polymer having a molecular weight higher than about 300,000;
(c) melting and extruding said thermally stabilized sucralose composition with said polymer having a molecular weight higher than about 300,000 to provide an encapsulated composition; and
(d) forming said encapsulated compositions to a particle size.

7. A method of preparing an encapsulated active composition comprising:
(a) preparing a thermally stabilized active composition comprising a polymer having a molecular weight from about 9,000 to about 200,000 and a heat sensitive active; wherein the heat-sensitive active is at least partially encapsulated by the polymer;
(b) combining said thermally stabilized active composition with a high molecular weight polymer having a molecular weight higher than about 300,000;
(c) melting and extruding said thermally stabilized active composition with said polymer having a molecular weight higher than about 300,000 to provide an encapsulated composition; and
(d) forming said encapsulated compositions to a particle size.

8. A gum composition comprising:
(a) a gum base; and
(b) an at least partially encapsulated sweetener composition comprising:
(i) a thermally stabilized sucralose composition comprising sucralose and a polymer having a molecular weight from about 9,000 to about 200,000; wherein the sucralose is at least partially encapsulated by the polymer; and
(ii) an encapsulating layer comprising a high molecular weight polymer having a molecular weight higher than about 300,000, said encapsulating layer at least partially encapsulating said thermally stabilized sucralose composition; wherein said thermally stabilized sucralose composition is encapsulated in the encapsulating layer.

9. The composition of claim 8, wherein said high molecular weight polymer is polyvinyl acetate having molecular weight of at least about 300,000.

10. The composition of claim 8, wherein said sweetener composition has an average particle size ranging from about 50 μm to about 800 μm.

11. The composition of claim 8, wherein said thermally stabilized sucralose composition comprises from about 5% to about 50% of said sweetener composition.

12. The composition of claim 8, wherein said sweetener composition further comprises an additional active.

13. The composition of claim 12, wherein said additional active is selected from the group consisting of high intensity sweeteners, flavors, medicaments, vitamins and combinations thereof.

14. A method of preparing an encapsulated active comprising combining a thermally stabilized active composition comprising a heat-sensitive active with a polymer having a molecular weight from about 9,000 to about 200,000 and a high molecular weight polymer having a molecular weight higher than about 300,000 followed by melting and extruding said thermally stabilized active composition and said high molecular weight polymer to provide an encapsulated active composition.

15. A composition comprising an extrudate of a polymer having a molecular weight from about 9,000 to about 200,000 and a heat-sensitive active; wherein the extrudate is combined with an encapsulating polymer by melt extrusion, wherein the encapsulating polymer is a high molecular weight polymer having a molecular weight higher than about 300,000, and wherein the composition shows no decomposition at a temperature of about 110° C.

16. A composition comprising:
   (i) a composition comprising a heat-sensitive active which is encapsulated with a polymer having a molecular weight from about 9,000 to about 200,000 and
   (ii) a high molecular weight polymer having a molecular weight higher than about 300,000 which encapsulates said composition comprising said heat-sensitive active; wherein the heat-sensitive active shows no decomposition at a temperature of about 110° C.

17. An encapsulated sweetener comprising the composition of claim 16.

18. The composition of claim 1, wherein the high molecular weight polymer has a molecular weight of about 500,000 or higher.

19. The encapsulated sweetener composition of claim 6, wherein the high molecular weight polymer has a molecular weight of about 500,000 or higher.

20. The method of claim 7, wherein the high molecular weight polymer has a molecular weight of about 500,000 or higher.

21. The composition of claim 8, wherein the high molecular weight polymer has a molecular weight of about 500,000 or higher.

22. The method of claim 14, wherein the high molecular weight polymer has a molecular weight of about 500,000 or higher.

23. The composition of claim 15, wherein the high molecular weight polymer has a molecular weight of about 500,000 or higher.

24. The composition of claim 16, wherein the high molecular weight polymer has a molecular weight of about 500,000 or higher.

25. The composition of claim 1, wherein the composition provides a sweetening perception upon chewing.

26. The encapsulated sweetener composition of claim 6, which provides a sweetening perception upon chewing.

27. The composition of claim 8, which provides a sweetening perception upon chewing.

28. The method of claim 14, wherein the encapsulated active composition provides a sweetening perception upon chewing.

29. The composition of claim 15, which provides a sweetening perception upon chewing.

30. The composition of claim 16, which provides a sweetening perception upon chewing.

* * * * *